(12) United States Patent
Zhu et al.

(10) Patent No.: US 6,776,904 B2
(45) Date of Patent: Aug. 17, 2004

(54) DEVICE AND METHOD OF USE FOR ALDEHYDE REMOVAL

(75) Inventors: Peter Zhu, Irvine, CA (US); Xiaolan Chen, Irvine, CA (US); Charles G. Roberts, Long Beach, CA (US)

(73) Assignee: Ethicon, Inc., Somerville, NJ (US)

( * ) Notice: Subject to any disclaimer, the term of this patent is extended or adjusted under 35 U.S.C. 154(b) by 95 days.

(21) Appl. No.: 09/746,344

(22) Filed: Dec. 22, 2000

(65) Prior Publication Data

US 2002/0117449 A1 Aug. 29, 2002

(51) Int. Cl.$^7$ .............................. B01D 15/00; A62D 3/00
(52) U.S. Cl. ...................... 210/205; 210/287; 210/908; 210/263; 210/501; 588/205
(58) Field of Search ................................ 210/205, 263, 210/282, 284, 287–290, 908, 169, 749, 151; 588/205; 435/176

(56) References Cited

U.S. PATENT DOCUMENTS

| | | | | |
|---|---|---|---|---|
| 3,811,224 A | * | 5/1974 | Garrison ...................... | 49/168 |
| 4,780,315 A | * | 10/1988 | Wu et al. .................... | 424/438 |
| 5,290,440 A | * | 3/1994 | Pirkle et al. ............. | 210/198.2 |
| 5,352,368 A | * | 10/1994 | Honeycutt ................... | 210/749 |
| 5,534,143 A | * | 7/1996 | Portier et al. ............... | 210/151 |
| 5,723,094 A | * | 3/1998 | Sunavala .................... | 422/197 |
| 5,998,184 A | * | 12/1999 | Shi ............................ | 435/176 |
| 6,068,980 A | * | 5/2000 | Decor et al. ................ | 435/458 |
| 6,210,566 B1 | * | 4/2001 | King ........................... | 137/268 |
| 6,399,850 B1 | * | 6/2002 | Chen et al. ................. | 210/749 |

FOREIGN PATENT DOCUMENTS

JP           7204661           8/1995

OTHER PUBLICATIONS

Product Information Sheet for poly(L-lycine) hydrobromide, The Sigma Chemical Company (St Louis, MO), 3 pages, dated Dec. 18, 1996.*

Pine et al., Organic Chemistry. 4th ed.. McGraw-Hlll, p. 787 (lycine structure).*

Non-confidential correspondence and literature from KEM Medical Products Corp.—Dated Feb. 28, 2001 ; Product Brochures (Glut-RX™ Glutaraldehyde Solution Neutralizer, KemSure™ OPA Solution Neutralizer, Neutralizing Spill Control Kits for glutaraldehyde, Neutralizing Absorbent Mats for Glutararaldehyde, Neutralizing Absorbent Mats of OPA, Neutralizing Spill Control Kits of OPA, Safety Nozzles); Results of Toxicity Test conducted From Nov. 29 Through Dec. 3, 2000 With a Neutralized Cidex™ OPA Solution, Jan. 2001 ; Results of Toxicity Test Using Neutralized Cidex™ Solution Conducted from Oct. 18 Through 22, 2000 Dec. 2000.

English Translation of Patent Application Disclosure (Kokai) No.: H-204661, Application No.: H6-4417; Filing Date: Jan. 20, 1994 (Japanese patent submitted in previous Information Disclosure Statement submitted on Apr. 2, 2001).

H. Y. Cheung, M. R. Brown, "Evaluation of glycine as an inactivator of glutaraldehyde," 34 J. Pharm. 211 (1982).

Japanese Abstract (English Equivalent of Patent No: JP 407204661A (Application No. JP06004416), "Treatment Agent of Waste Glutaraldehyde Liquid and Treatment of Waste", Aug. 8, 1995.

Seyhan N. Ege, "Organic Chemistry, Structure and Reactivity", Third Edition, 1994m o, 534–535.

* cited by examiner

Primary Examiner—Chester T. Barry
(74) Attorney, Agent, or Firm—Theodore Shatynaki

(57) ABSTRACT

Methods and a device for removing aldehydes from a waste stream are disclosed. In a preferred embodiment, the device provides for and the method uses a chemical or an aminated surface having primary amine functionality resulting from the amination of a support material such as silica.

10 Claims, 2 Drawing Sheets

Waste Stream Aldehyde Removal Device

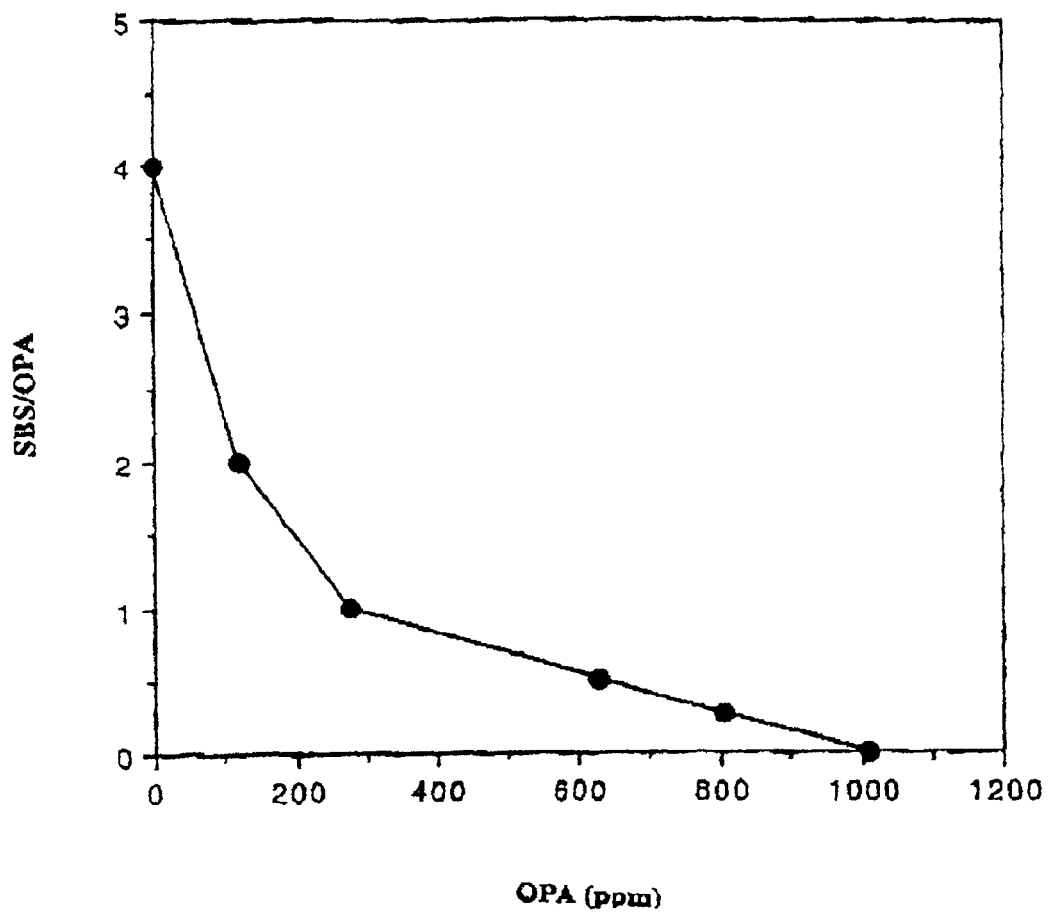
Figure 1: Ratio of SBS:OPA vs. Concentration OPA Remaining After 30 Minutes From Combining The Ingredients.

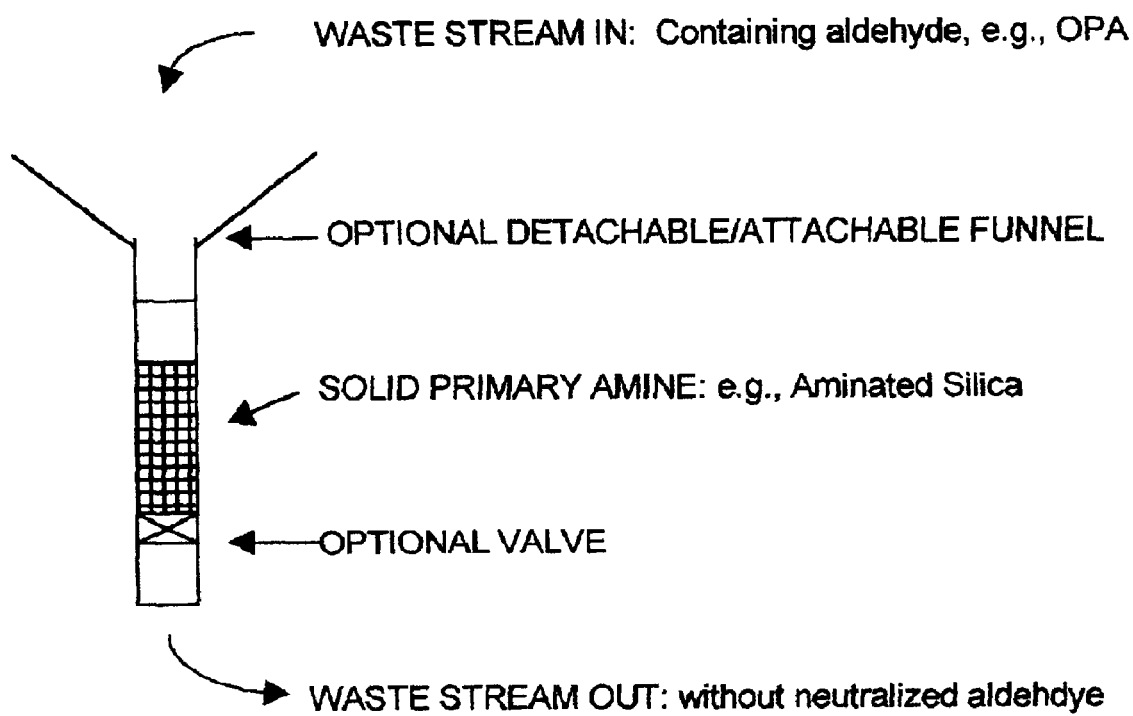
FIG. 2: Waste Stream Aldehyde Removal Device

DEVICE AND METHOD OF USE FOR ALDEHYDE REMOVAL

BACKGROUND OF THE INVENTION

1 Field of the Invention

The invention relates to treatment of aldehydes for the purpose of complying with waste disposal requirements established by federal and state environmental protection agencies.

2 Description of Related Art

Waste disposal of aldehydes has become increasingly more difficult over the years. Law requires treatment of wastes containing a certain amount of aldehyde prior to placement of the waste into the environment. The extent of such treatment may vary depending upon the location of where the waste is generated and the stringency of the environmental standards in that area. For example, waste containing aldehyde may be classified as a hazardous waste in California under 22 CAL. CODE REGS., TIT. 22, § 66696. Formaldehyde also may be considered a hazardous waste on the federal level under 40 C.F.R. § 261.33(e) if it is a commercial chemical product (e.g., pure technical grade formaldehyde or formaldehyde is the sole active ingredient of the product that is to be disposed). Every state has an environmental regulation that is at least as stringent as this formaldehyde standard. State regulations also may be more stringent than this standard.

Additionally, facilities that discharge waste water to Publicly Owned Treatment Works ("POTW") or directly into navigable waters may be required to meet standards that are established by a government agency. The standard may vary for each facility depending upon the quality of the receiving water and the concentration of aldehyde found in the waste water that is discharged into the environment by industry in that area.

Waste containing aldehyde may be generated by a variety of processes. For example, aldehydes such as glutaraldehyde and ortho-phthalaldehyde ("OPA") are used in disinfecting medical devices or instruments. Waste containing aldehydes also may be generated by painting operations, stripping operations related to floors, or other manufacturing operations.

Typically, ammonia and sodium bisulfite ("SBS") are used to treat many aldehydes. These compounds, however, have not proven to be effective at neutralizing OPA in accordance with environmental regulations.

A waste is classified as a hazardous waste in California if the waste being examined "has an acute aquatic 96-hour $LC_{50}$ less than 500 milligrams per liter (mg/L) when measured in soft water (total hardness 40 to 48 milligrams per liter of calcium carbonate) with fathead minnows . . . " 22 CAL. CODE REGS., TIT. 22, § 66696. $LC_{50}$ represents the concentration of a waste that is necessary to kill 50% of a particular animal exposed to a waste.

Note that a nonhazardous waste is generally considered by federal and state environmental agencies as a waste that does not satisfy the criteria set forth in defining a hazardous waste. Therefore, wastes generated in California that have a $LC_{50}$>500 mg/L are nonhazardous wastes and wastes having $LC_{50}$<500 mg/L are classified as hazardous. SBS, for example, in combination with OPA, produces a product that is generally considered hazardous under California environmental law as shown in Table 1 by $LC_{50}$ being consistently below 500 mg/L. For this study, CIDEX®OPA (commercially available from Advanced Sterilization Products®, a Johnson & Johnson Company of Irvine, Calif.) was used to supply the OPA.

TABLE 1

Neutralization Of OPA using SBS

| Sample Type | OPA Content (%) | $LC_{50}$ (mg/l) | Comments |
|---|---|---|---|
| Fresh CIDEX ® OPA at 0.3% OPA | 0.301% | 31.1 mg/l | 1 |
| Fresh CIDEX ® OPA at 0.15% OPA | 0.158% | 50.4 mg/l | 2 |
| Reuse CIDEX ® OPA at 0.3% OPA | 0.295% | 31.1 mg/l | 3 |
| SBS/OPA = 4:1 | N/A | 68.3 mg/l | 4 |
| SBS/OPA = 2:1 | N/A | 46.3 mg/l | 5 |

1. Fresh CIDEX ® OPA at 0.3% OPA was prepared by diluting the fresh Cidex OPA solution with deionized water.
2. Fresh CIDEX ® OPA at 0.15% OPA was prepared by diluting the fresh Cidex OPA solution with deionized water to the level of 0.15% of OPA.
3. Reuse of CIDEX ® OPA at 0.3% OPA was prepared by diluting the simulated reuse CIDEX ® OPA (14 days) with deionized water.
4. SBS/OPA = 4:1, 10% SBS (10 ml) was combined with 100 ml of the fresh CIDEX ® OPA solution at 0.3% OPA (sample 1 above) at the SBS/OPA molar ratio of 4 to 1 for 30 minutes, and then the combined solution was used in the 22 CAL. CODE REGS., TIT. 22, § 66696 test for California.
5. SBS/OPA = 2:1, 10% SBS (5 ml) was combined with or 100 ml of the fresh CIDEX ® OPA solution at 0.3% OPA (sample 1 above) at the SBS/OPA molar ratio of 2 to 1 for 30 minutes, and then the combined solution was used for the fish test in the 22 CAL. CODE REGS., TIT. 22, § 66696 test for California.

In addition to lacking the ability to effectively neutralize OPA, ammonia and SBS are problematic since they may be harmful to the environment.

FIG. 1 shows that when OPA is combined with SBS at the molar ratio of SBS/OPA=4:0 for 30 minutes, OPA has been neutralized since the OPA concentration is nondetectable in a high performance liquid chromatography (HPLC) analysis method, which has detection limit for OPA at 10 ppm. However, the end product is still classified as a hazardous waste as shown in Table 1. Therefore, even though the aldehyde is neutralized completely by a neutralizer, the end product may still be a hazardous waste.

Although glycine has been shown to neutralize glutaraldehyde (see H. Y. Cheung & M. R. W. Brown, *Evaluation of Glycine As An Inactivator of Glutaraldehyde*, 34 J. PHARM. 211 (1982)), the toxicity of reaction products of glycine has not been studied. Therefore, it is not known from this article whether the reaction product is nonhazardous. Accordingly, it is desirable to have a neutralizer that effectively neutralizes aldehydes in compliance with environmental standards and is less toxic to the environment.

There are a number of other challenges associated with treatment of aldehydes. One is to find a resulting end product that does not introduce any additional problems over the initial neutralization proposed. For example, it has been reported that treatment of aldehydes with neutralizing amino acids forms Schiff's bases which may have the effect of reverting back to the untreated aldehydes under certain conditions.

A method of solving the reversion problem is disclosed in commonly assigned and co-filed patent application U.S. Ser. No. 09/747,230, (Attorney Docket Number ASP-009), filed Dec. 22, 2000. The present invention offers another solution to treating aldehydes in a manner that does not require additional treating agents.

SUMMARY OF THE INVENTION

A device and method for removing aldehydes from a stream is disclosed. In one aspect, the invention provides a generally nonhazardous means for removing aldehydes in accordance with applicable environmental regulations prior to disposal.

In one embodiment, a method and device are disclosed for removing aldehydes from a waste stream comprising the step of:

a) contacting the waste stream containing the aldehyde with a solid primary amine thereby binding the aldehyde to the solid primary amine.

In other embodiments, the methods and devices include the solid primary amine comprising a compound having primary amine functionality which is chemically bonded to a support, preferably silica.

Advantages of this invention include treatment of aldehyde-containing wastes which will minimize or eliminate discharge of aldehydes and their derivatives to the environment. Also, since the treated waste is immediately disposed after treatment, there is no risk of mistakenly re-using of the treated waste. The invention also avoids the need to add chemicals to neutralize the aldehyde. In preferred embodiments, when support materials are used that involve use of high surface area particles, such as silica, any bio-hazard materials left in the used disinfectant solution are captured. Also, when silica is used, it affords an inexpensive source for support particles and amination of silica is a simple process. Once the invention treatment device has reached its capacity, it may be simply disposed according to solid waste disposal guidelines.

Additional features, embodiments, and benefits will be evident in view of the figures and detailed description presented below.

BRIEF DESCRIPTION OF THE DRAWINGS

The features, aspects, and advantages of the invention will become more thoroughly apparent from the following detailed description, appended claims, and accompanying drawings in which:

FIG. 1 shows the ratio of SBS:OPA and the concentration of OPA remaining in solution after 30 minutes from combining the ingredients.

FIG. 2 shows a schematic diagram of one embodiment for the device of this invention.

DETAILED DESCRIPTION OF THE INVENTION

The invention relates to treatment of waste containing aldehydes generated particularly from sterilizing medical devices (e.g., scalpels, scissors, endoscopes, etc.) or laboratory equipment (e.g., glassware) that have been exposed to microorganisms such as bacteria. Sterilizing includes disinfecting medical devices.

To remove aldehydes, the waste containing the aldehyde is contacted with a device that scavenges or binds the aldehyde before the waste is placed into a sewer system that may discharge to a POTW or into navigable waters.

The device and method of this invention offer an advantage over other typical methods using chemicals such as ammonia, sodium bisulfite, or other chemicals used to neutralize aldehydes since nothing further is required to be added to a waste as the waste is simply passed through the scavenging device which binds the aldehyde and prevents its discharge into the environment.

The operation of this invention may be depicted by the following equation:

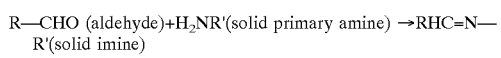

R—CHO (aldehyde)+$H_2$NR'(solid primary amine) →RHC=N—R'(solid imine)

As used herein, the term solid primary amine is intended to describe materials that have the functionality of a primary amine and is capable of scavenging or binding an aldehyde from a waste stream; thus the solid primary amine does not dissolve in solution but allows for removal of aldehydes from the waste stream through binding with the solid primary amine.

Solid primary amines, R—$NH_2$, can be any solid polymer or co-polymer, or any solid chemical comprising primary amino groups. It can also include any support materials that have been aminated, coated, or impregnated to have the functionality of a primary amine. The solid primary amines can have one or more primary amino groups.

Examples of solid primary amines include, but are not limited to, the following chemicals:

(A) Silica Type Systems (1) Aldehyde scavenger using silica with 3-aminopropyltrimethoxysilane (Amino-Silanes): It is advantageous to use silica as a support material since a very high density of amino groups can be introduced to the high surface area of silica particles (~500 $m^2$/g). Using this aminated polymer as filling material in a filtering cartridge, aldehydes will be caught as the used disinfectant solution passes through the cartridge. The aldehyde scavenger can be produced as below:

Silica surface     3-Aminopropyltrimethoxysilane

The Aldehyde Scavenger
(Covalently aminated silica surface)

The aldehyde scavenger can then react with aldehyde to form the neutralized aldehyde as indicated with the following two equations.

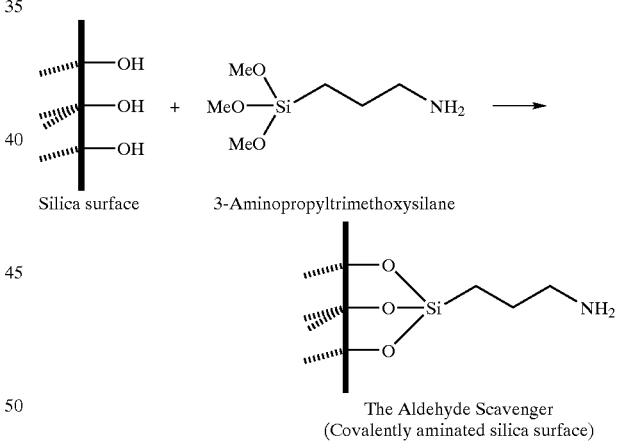

The aldehyde scavenger

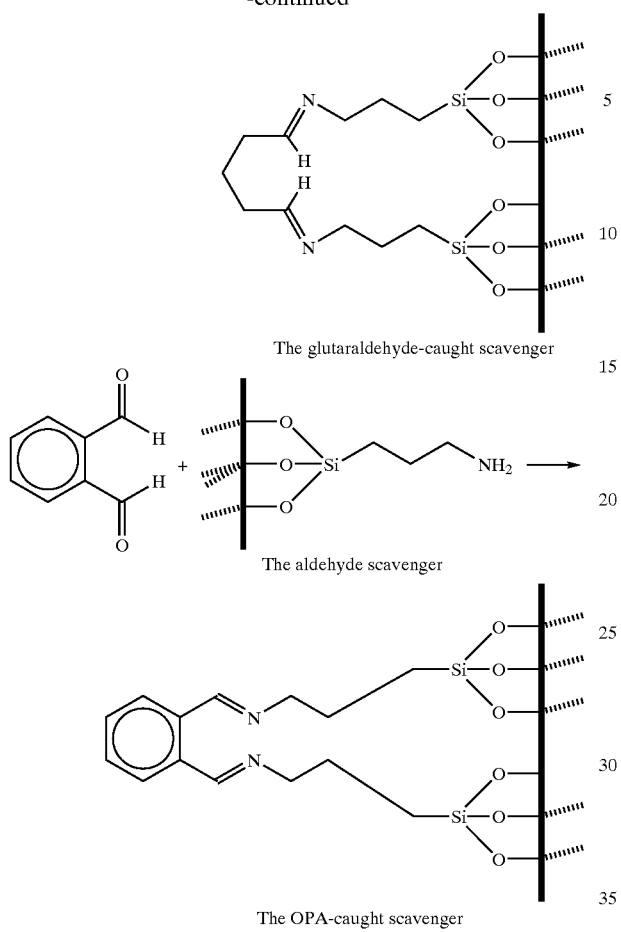

The glutaraldehyde-caught scavenger

The aldehyde scavenger

The OPA-caught scavenger (2) Aldehyde scavenger using silica with 3-aminopropyltriethoxysilane (Amino-Silanes): The trimethoxy group in the above example can be replaced by other similar groups, such as triethoxy group, to produce the same aldehyde scavenger.

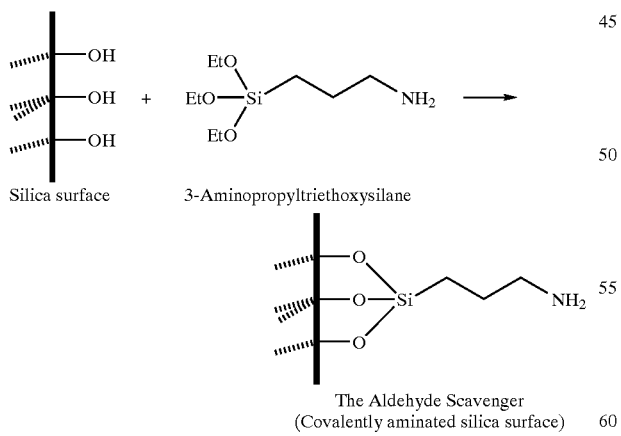

The Aldehyde Scavenger
(Covalently aminated silica surface)

(3) Scavenger using silica with N-(2-aminoethyl)-3-aminopropyltriethoxysilane (Amino-Silanes): The amino side-chain in 3-aminopropyltrimethoxysilane can be varied either by the structure feature or by the length of the chain to give aminated silica with similar property.

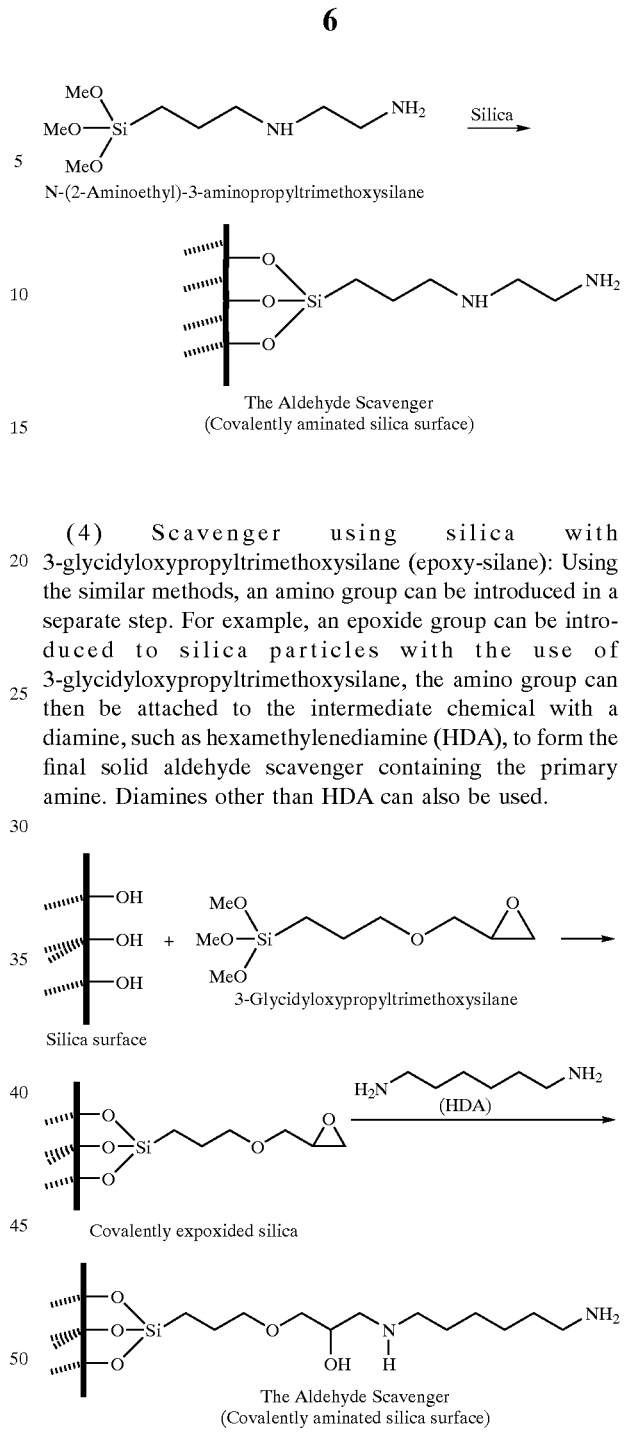

N-(2-Aminoethyl)-3-aminopropyltrimethoxysilane

The Aldehyde Scavenger
(Covalently aminated silica surface)

(4) Scavenger using silica with 3-glycidyloxypropyltrimethoxysilane (epoxy-silane): Using the similar methods, an amino group can be introduced in a separate step. For example, an epoxide group can be introduced to silica particles with the use of 3-glycidyloxypropyltrimethoxysilane, the amino group can then be attached to the intermediate chemical with a diamine, such as hexamethylenediamine (HDA), to form the final solid aldehyde scavenger containing the primary amine. Diamines other than HDA can also be used.

3-Glycidyloxypropyltrimethoxysilane

Covalently expoxided silica

The Aldehyde Scavenger
(Covalently aminated silica surface)

Using other epoxide compounds, such as 2(3,4-epoxycyclohexyl)ethyltrimethoxysilane, can also produce the silica with similar functionality.

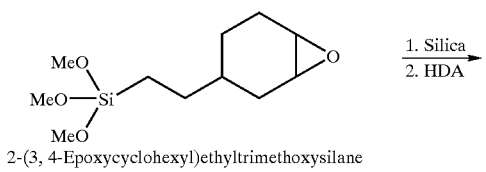

2-(3, 4-Epoxycyclohexyl)ethyltrimethoxysilane

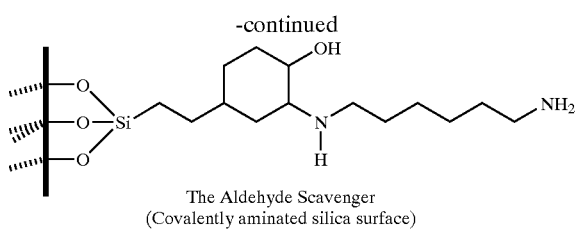

The Aldehyde Scavenger
(Covalently aminated silica surface)

The lengthened amino bearing chains, in the above examples, may reduce the steric hindrance on the local silica surface areas where the aldehydes, especially the bulkier aldehydes need to be neutralized.

(5) Scavenger using silica with (3-Isocyanatopropyl) triethoxysilane or (3-Isothiocyanatopropyl)trimethoxysilane (isocyano-silane or isothiocyano-silane): The corresponding isocyanates of the above silanes are another type of extender for aminated silica, such as (3-isocyanatopropyl) triethoxysilane, can bind to silica surface before binding the amino-moiety.

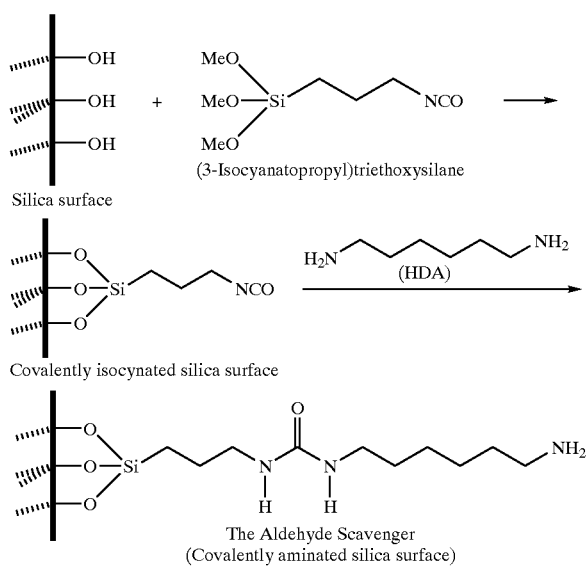

The following isothiocyanates can be also used.

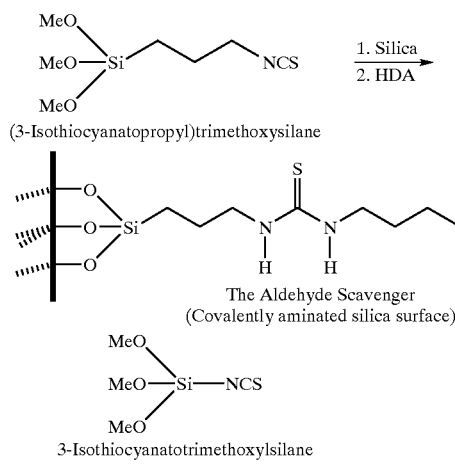

(6) Aldehyde scavenger with multiple amino groups: One of the advantages to make aminated silica using epoxy group-bearing, isocyano group-bearing and isothiocyano group-bearing silica is the possibility to introduce dendrimer amino groups to the silica and thus the active reaction sites for aldehydes can be multiplied. Dendrimer is a type of functional polymer which contains many functional groups on the surface or on the outer-most shell. For example, this functional silica is formed when reacting with amino-rich molecules (small molecules or large polymers) where one of the amino groups is needed for attachment and the rest of the amino groups can be used for aldehyde scavenging. The simplest example is the reaction with tris(2-aminoethyl) amine as shown below where one amino group is used to attach to the silica while the rest of the two free amine groups can be used for aldehyde neutralization. Other amino-rich molecules (small molecules or large polymers) and silica (epoxy group-bearing, isocyano-bearing silica etc.) can also be used to give similar aldehyde scavengers with multiple amino groups.

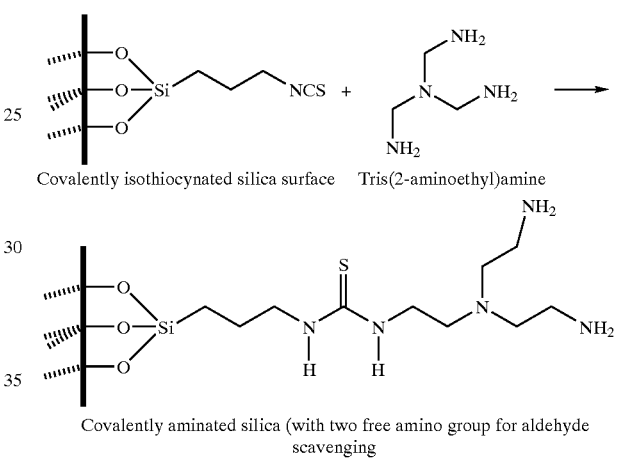

Other starburst polymeric amines and comb polymers containing multiple amino groups can also be used in the same way to produce solid primary amine scavengers with multiple amino groups.

(B) Polymer-linked Systems

Polymer-linked systems are intended to comprise animated surfaces wherein a base polymer is chemically linked to an amine having primary amine functionality. Examples of this type include tris(2-aminoethyl)amine, polymer linked (Aldrich 4,7210-7), diethylenetriamine, polymer-linked (Aldrich 4,7978-0) (Refs. Booth, R. J.; Hodges, J. C. *J. Am. Chem. Soc.* 119, 4882, 1997; Parlow, J. J. et al. *J. Org. Chem.* 62, 5908, 1997; Routledge A. et al. *Tetrahedron Lett,* 38, 1227, 1997).

Polymer: poly(styrene-co-divinylbenzene)

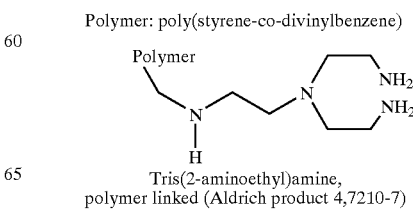

Tris(2-aminoethyl)amine,
polymer linked (Aldrich product 4,7210-7)

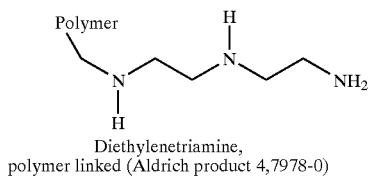

Diethylenetriamine,
polymer linked (Aldrich product 4,7978-0)

Another example is the intercalate formed upon heating of silica with polyallyamine. The intercalate formed is an organic/inorganic polymer which does not separate into their parent polymers due to intermolecular networking formed during heating.

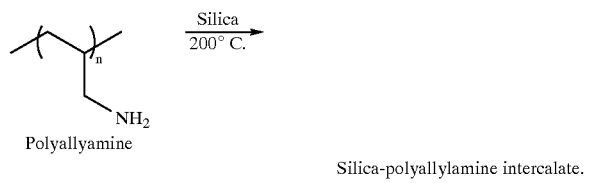

This group may also include other types of amines supported or linked to a polymer system.

(C) Polymeric Amino Group-rich System

Several examples are given below which include some polymers suitable to introduce amino groups and some others already have rich amino groups.

(1) Polysaccharides-derived Polyamines: These are made from starch and cellulose which are "glucose polymers". Amino groups can be attached to the backbone by selective oxidation, Schiff's base formation and $NaBH_4$ reduction, as shown below:

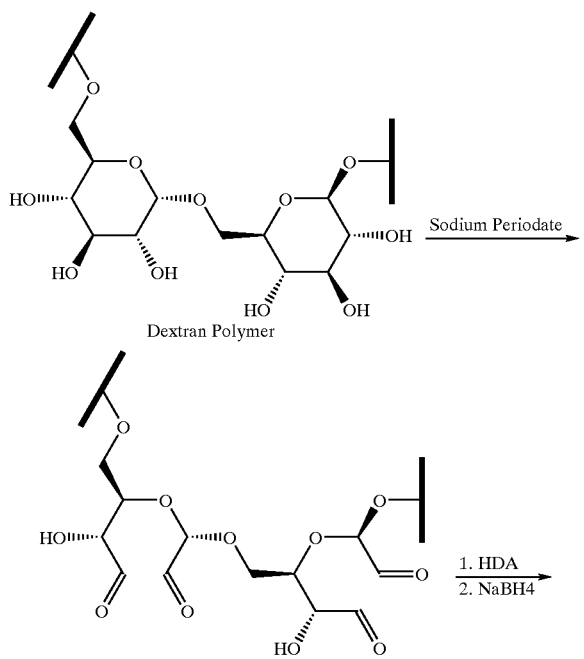

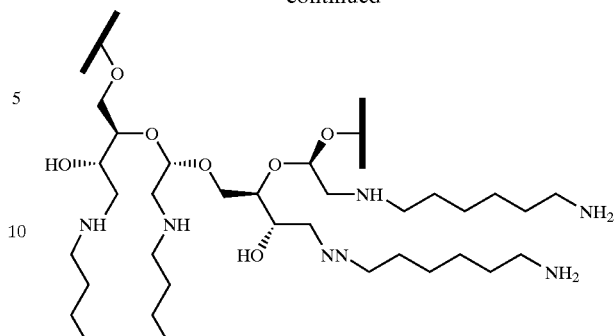

The Aldehyde Scavenger
(Aminated dextran)

(2) Chitosan (deacetylated chitin, poly-(1→4)-β-D-glucosamine)

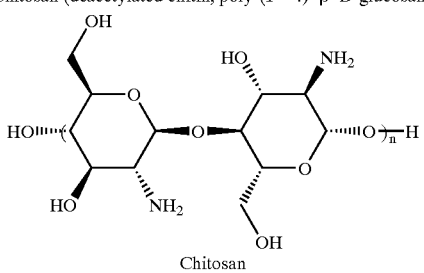

Chitosan

This natural polymer has high amine density since each sugar unit has a primary amino group. Chitosan's (1) wide natural source (from crab and shrimp shells) (2) low price and (3) biodegradation property make it attractive for the current application. However, the aldehyde scavenging capacity of this polymer is related to the powder size. Therefore, it's important to grind it to fine powder to be an efficient scavenger.

The device of the invention can be any container, cartridge, or filter with an inlet for receiving an aldehyde-containing stream and an outlet for releasing the treated stream having the neutralized aldehyde removed. The outlet can have an optional valve to control the flow rate of the aldehyde-containing stream.

FIG. 2 depicts a schematic of one embodiment of this invention involving the use of aminated silica particles as the solid primary amine. Referring to FIG. 2, a waste stream containing aldehyde, in this case o-phthalaldehyde, enters the device depicted as a cylinder. At the exit of the device, the treated stream is devoid of aldehyde having been bound to the aminated silica. Also, FIG. 2 depicts the optional control valve.

In practice, the completeness for the removal of aldehyde will be dependent on a number of variables readily apparent to one of skill in the art. Factors such as aldehyde concentration in the waste stream, waste flow rate, type of aldehyde to be removed, type of solid primary amine to be used, safety margin, etc., are some of the criteria needed to properly size the device. It will also be appreciated by those of skill in the art that factors such as support material particle size will be an adjustable parameter in setting an adequate flow rate and contact time to insure that the aldehyde has sufficient opportunity to bind.

The device of this invention will also have benefits in being suitable for use as cartridges that can easily be removed and replaced from a discharge waste line containing aldehydes. Additional filtering aids and/or materials may be added to the device to filter other unwanted material from the waste stream, but in the case when a high surface area particle, such as silica, is used to support the primary amine function, many materials such as proteins, blood residues will be captured by the cartridge via both physical filtration mechanism and hydrogen bonding principles.

After the device has reached the end of its utility for effectively removing the aldehyde, the cartridge will be disconnected from the waste line and be disposed like normal waste solid according to acceptable solid waste guidelines. It will be apparent to those of skill in the art that sensors may be used to detect breakthrough of aldehyde signaling a need for replacement of the cartridge. A convenient control to prevent interruption of waste treatment would be to automatically control flow valves to switch the flow of waste to a parallel cartridge allowing an operator time to change out the spent cartridge.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A device for removing aldehydes from a waste stream comprising:
   a) a container with an inlet and an outlet; and
   b) a source of solid primary amine enclosed within the container, wherein the solid primary amine neutralizes and removes the aldehyde from the waste stream.

2. The device of claim 1, wherein the solid primary amine is a solid chemical comprising at least one primary amino group.

3. The device of claim 2, wherein the solid primary amine is in the form of an aminated surface having primary amine functionality.

4. The device of claim 2, wherein the aminated surface comprises the primary amine chemically bonded to a silica supporting material.

5. The device of claim 4, wherein the primary amine is a polymer or co-polymer comprising a primary amino group.

6. The device of claim 5, wherein polymer or co-polymer comprises tris(2-aminoethyl)amine linked to poly(styrene-co-divinylbenzene) or diethylenetriame linked to a peptide resin.

7. The device of claim 3, wherein the aminated surfaces are selected from the group consisting of animated polysacharides, chitosan, and mixtures thereof.

8. The device of claim 3, wherein the aminated surface is silica-polyallyamine intercaclate.

9. The device of claim 3, wherein the aminated surface is aminated dextran.

10. The device of claim 1 further comprising a valve to control the flow of the waste stream.

* * * * *